United States Patent [19]
Rivers et al.

[11] Patent Number: 5,900,193
[45] Date of Patent: May 4, 1999

[54] CARBON-CARBON PISTON ARCHITECTURES

[75] Inventors: H. Kevin Rivers, Hampton; Philip O. Ransone, Gloucester; G. Burton Northam, Carrollton, all of Va.; Francis A. Schwind, Fort Worth, Tex.

[73] Assignee: The United States of America as represented by the Administrator of the National Aeronautics and Space Administration, Washington, D.C.

[21] Appl. No.: 08/805,195

[22] Filed: Feb. 27, 1997

Related U.S. Application Data

[60] Provisional application No. 60/012,930, Mar. 6, 1996.

[51] Int. Cl.⁶ .................................................. C01B 31/00
[52] U.S. Cl. .......................... 264/29.5; 156/148; 156/154
[58] Field of Search ........................... 264/29.5; 156/148, 156/154; 92/172, 208, 212

[56] References Cited

U.S. PATENT DOCUMENTS

| | | |
|---|---|---|
| 4,659,624 | 4/1987 | Yeager et al. . |
| 4,683,809 | 8/1987 | Taylor . |
| 4,736,676 | 4/1988 | Taylor . |
| 4,795,677 | 1/1989 | Gray . |
| 4,909,133 | 3/1990 | Taylor . |
| 5,009,823 | 4/1991 | Kromrey . |
| 5,083,537 | 1/1992 | Onofrio et al. . |
| 5,217,657 | 6/1993 | Engle . |
| 5,370,087 | 12/1994 | Guimond et al. . |
| 5,437,821 | 8/1995 | Diberardino et al. . |
| 5,525,558 | 6/1996 | Niwa et al. . |
| 5,578,255 | 11/1996 | Okuyama et al. . |

*Primary Examiner*—Christopher A. Fiorilla
*Attorney, Agent, or Firm*—Kurt G. Hammerle

[57] ABSTRACT

An improved structure for carbon-carbon composite piston architectures consists of replacing the knitted fiber, three-dimensional piston preform architecture described in U.S. Pat. No. 4,909,133 (Taylor et al.) with a two-dimensional lay-up or molding of carbon fiber fabric or tape. Initially, the carbon fabric or tape layers are prepregged with carbonaceous organic resins and/or pitches and are laid up or molded about a mandrel, to form a carbon-fiber reinforced organic-matrix composite part shaped like a "U" channel, a "T"-bar, or a combination of the two. The molded carbon-fiber reinforced organic-matrix composite part is then pyrolized in an inert atmosphere, to convert the organic matrix materials to carbon. At this point, cylindrical piston blanks are cored from the "U"-channel, "T"-bar, or combination part. These blanks are then densified by reimpregnation with resins or pitches which are subsequently carbonized. Densification is also be accomplished by direct infiltration with carbon by vapor deposition processes. Once the desired density has been achieved, the piston billets are machined to final piston dimensions; coated with oxidation sealants; and/or coated with a catalyst. When compared to conventional steel or aluminum alloy pistons, the use of carbon-carbon composite pistons reduces the overall weight of the engine; allows for operation at higher temperatures without a loss of strength; allows for quieter operation; reduces the heat loss; and reduces the level of hydrocarbon emissions.

22 Claims, 5 Drawing Sheets

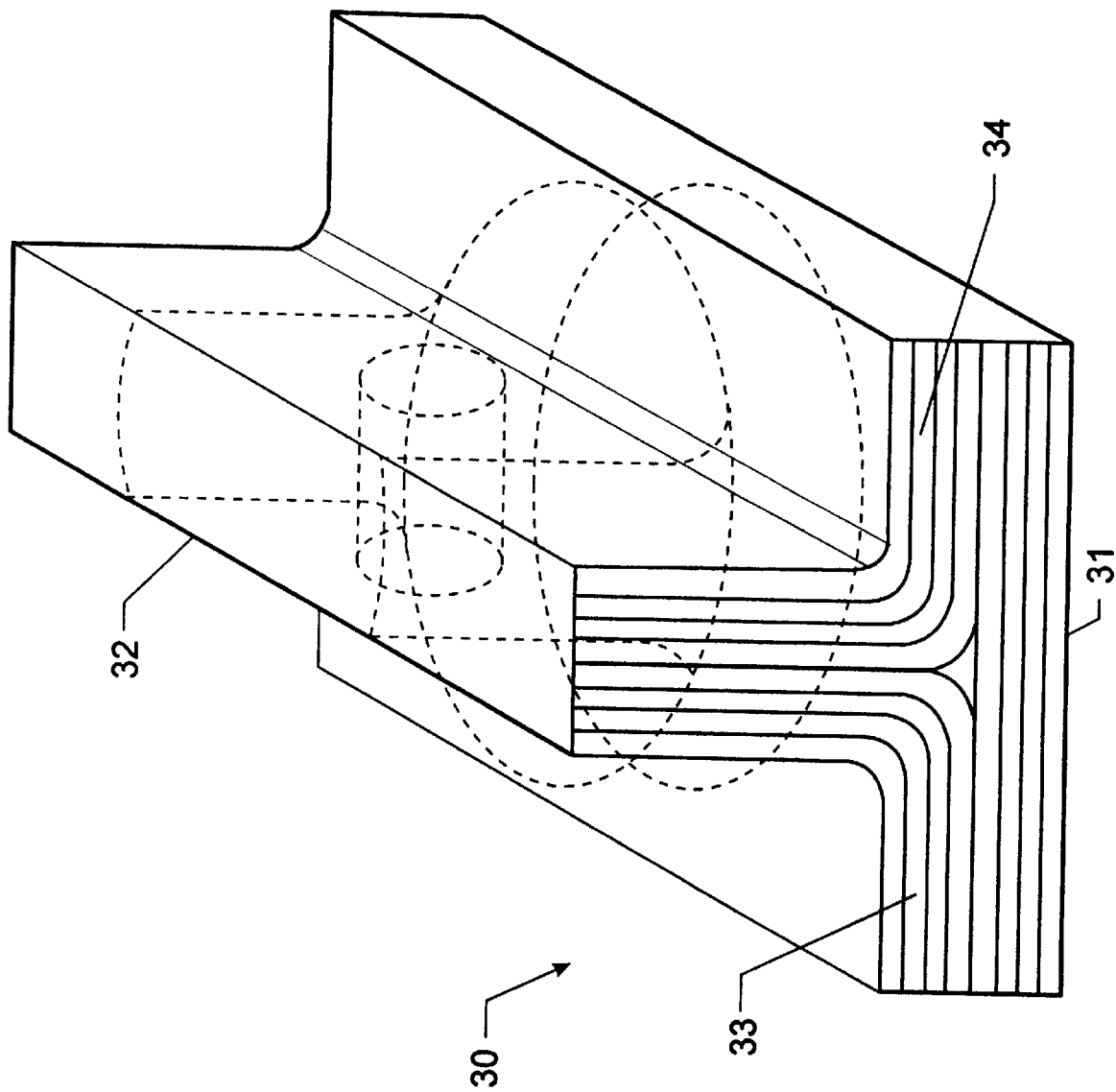

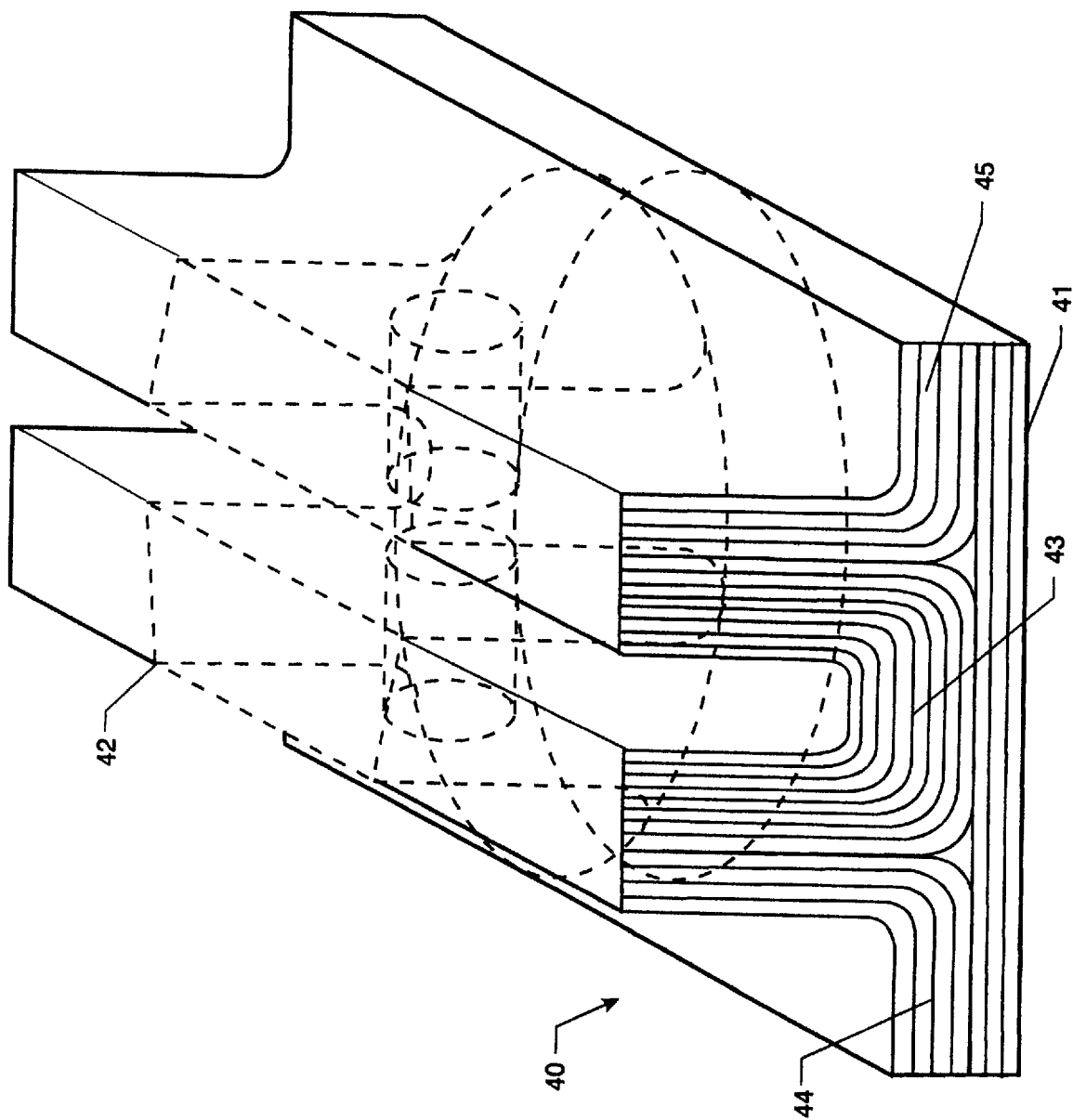

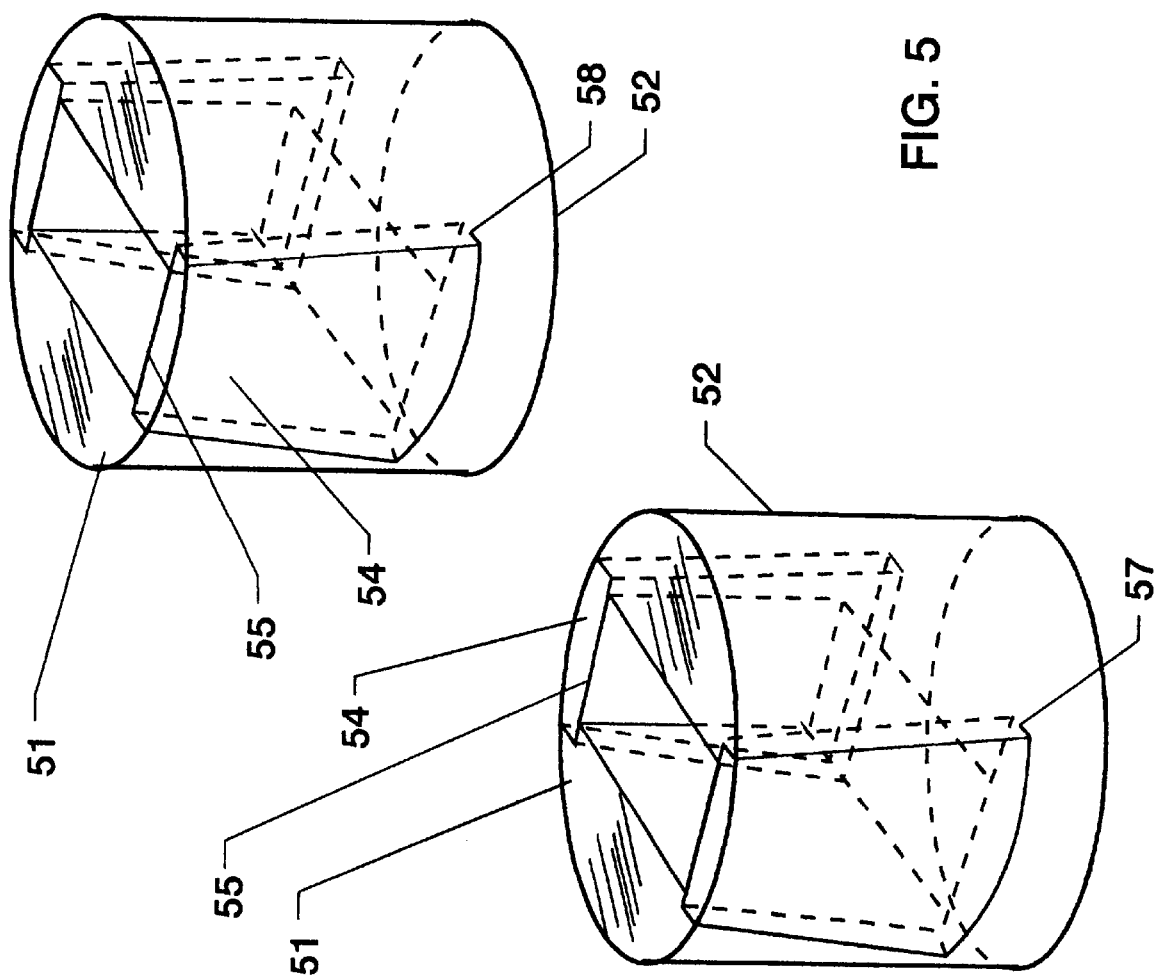

CARBON-CARBON PISTON ARCHITECTURES

CLAIM OF BENEFIT OF PROVISIONAL APPLICATION

Pursuant to 35 U.S.C. §119, the benefit of priority from provisional application 60/012,930, with a filing date of Mar. 6, 1996, is claimed for this non-provisional application.

ORIGIN OF THE INVENTION

This invention was jointly made by NASA employees and an employee of Carbon-Carbon Advanced Technology, Inc. under purchase order no. L-62270 and may be manufactured and used by or for the Government for governmental purposes without the payment of any royalties thereon or therefor.

BACKGROUND OF THE INVENTION

1. Field of the Invention

This invention relates to lightweight piston design, and more specifically to improved structures for a carbon-carbon composite piston.

2. Descrintion of the Related Art

Carbon-carbon composite materials, as used herein, refers to a predominantly carbon matrix material reinforced with predominantly carbon fibers. The properties of these materials may be tailored to produce any desired mechanical and physical properties by preferred orienitation of the continuous or staple fibers in the composite materials; and/or by the selection of additives; and/or by thermal treatment of the fibers and matrix before, during, or after fabrication. Carbon-carbon composite materials may be cast, molded, or machined. The surface or near-surface material can also be treated and/or coated with oxidation protection or sealing materials, or with a catalytic materials such as nickel.

Carbon-carbon composite materials have been developed for aerospace applications for which high-temperature strength, light weight, and dimensional stability are desirable. Current aerospace application of carbon-carbon composite materials includes use as heat-shield material on advanced aerospace vehicles. Non-aerospace applications have been suggested due to the mechanical and physical advantages of carbon-carbon composite materials. Current non-aerospace applications include use in brakes and clutches for high-performance automobiles and in brakes for aircraft.

Internal combustion reciprocating engines and compressors used for aerospace, military, and transportation applications must be lightweight and capable of operating at elevated temperatures and pressures. Current state-of-the-art of piston manufacture employs aluminum alloys and steel because pistons composed of these materials can withstand the relatively high temperatures and pressures associated with operation of an internal combustion engine or compressor. However, engine and compressor pistons manufactured of steel and/or aluminum alloys are significantly heavier than pistons made of carbon-carbon composite materials. In addition, aluminum alloy and steel pistons lose strength at elevated temperatures, i.e. operating temperatures above 600 degrees Fahrenheit (F), while carbon-carbon composite pistons retain their strength under operating conditions which exceed 1200 degrees F.

The inherently high coefficient of thermal expansion of aluminum alloys also necessitates larger clearances between an aluminum alloy piston and an engine cylinder wall, to allow for expansion of the aluminum alloy piston during high temperature engine operation. In order to seal the gap between an aluminum alloy piston and engine cylinder wall, the piston must be fitted with a plurality of piston rings which seal the gap until the aluminum alloy piston has expanded sufficiently. However, at operating temperatures above 300 degrees F, the mechanical strength of aluminum alloy pistons decreases dramatically. This strength loss precludes locating the uppermost compression piston ring too close to the top, or crown, of the piston. Thus, a crevice between the piston crown and the uppermost compression ring is created. This crevice allows raw, unconsumed fuel to escape directly into the atmosphere, which contributes to atmospheric pollution and reduces fuel efficiency.

Another disadvantage associated with aluminum alloy pistons is the noise created as the undersized aluminum alloy pistons "rock" within the cylinder chamber.

SUMMARY OF THE INVENTION

It is an object of this invention is to reduce the weight of an internal combustion reciprocating engine and/or compressor with the use of carbon-carbon composite pistons.

It is another object of the present invention to provide an engine and/or compressor piston with adequate mechanical strength during high engine operating temperatures.

Another object of the invention is to provide an engine and/or compressor piston with a low coefficient of thermal expansion, resulting in lower distortion and higher dimensional stability.

It is yet another object of the invention to provide an engine and/or compressor piston which can be ringless.

It is a further object of the invention to provide an engine and/or compressor piston which improves engine operating efficiency.

It is a further object of the invention to provide an engine and/or compressor piston which operates more quietly.

It is a further object of the invention to provide an engine piston which reduces the emission of hydrocarbons during operation by reducing the crevice volume.

According to the present invention, the foregoing and additional objects are attained by providing an improvement of a carbon-carbon composite piston, wherein the improvement consists of replacing the knitted fiber, three-dimensional piston preform architecture described in U.S. Pat. No. 4,909,133 (Taylor et al.) with a two-dimensional lay-up or molding of carbon fiber fabric or tape. Initially, the carbon fabric or tape layers are prepregged with carbonaceous organic resins and/or pitches and are laid up or molded about a mandrel, to form a carbon-fiber reinforced organic-matrix composite part shaped like a "U" channel, a "T"-bar, or a combination of the two. The molded carbon-fiber reinforced organic-matrix composite part is then pyrolized in an inert atmosphere, to convert the organic matrix materials to carbon. At this point, cylindrical piston blanks are cored from the "U"-channel, "T"-bar, or combination part. These blanks are then densified by reimpregnation with resins or pitches which are subsequently carbonized. Densification is also be accomplished by direct infiltration with carbon by vapor deposition processes. Once the desired density has been achieved, the piston billets are machined to final piston dimensions; coated with oxidation sealants; and/or coated with a catalyst.

BRIEF DESCRIPTION OF THE DRAWINGS

FIG. 3 is an illustration of a "T"-shaped channel billet for making a carbon-carbon composite piston according to the present invention;

FIG. 4 is an illustration of a combination "U"- and "T"-shaped channel billet for making a larger carbon-carbon composite piston according to the present invention; and FIG. 5 is an illustration of a dovetail notch detail for installing a bridge according to the present invention.

DETAILED DESCRIPTION OF THE INVENTION

Figure 1:
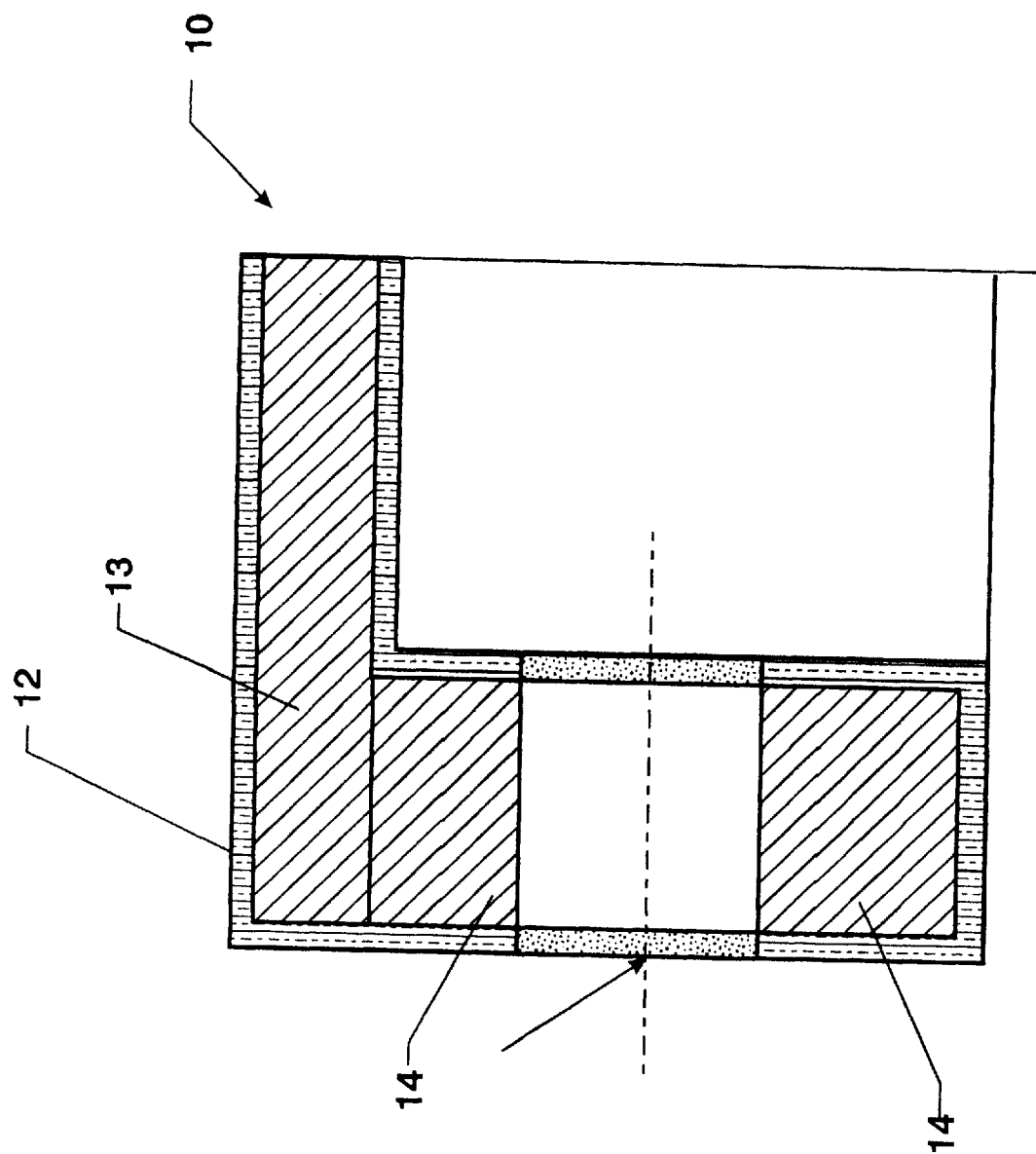
FIG. 1 is an illustration of a prior art knitted carbon fiber structure engine piston.

The invention is an improvement in the manufacture and structure of a lightweight carbon-carbon composite engine piston for use in internal combustion engines and/or compressors. U.S. Pat. No. 4,909,133 by Taylor et al. discloses the use of knitted or warp interlock preforms which are embedded in the composite matrix so as to comprise structural components of the completed piston. The lightweight piston architecture claimed by Taylor et al. is shown as FIG. 1 which depicts a carbon-carbon composite engine piston 10 which includes a knitted or woven carbon fiber structure 12 which is selectively reinforced with directionally-oriented carbon fibers at the crown 13 and adjacent to the wrist pin boss 14.

Figure 2:
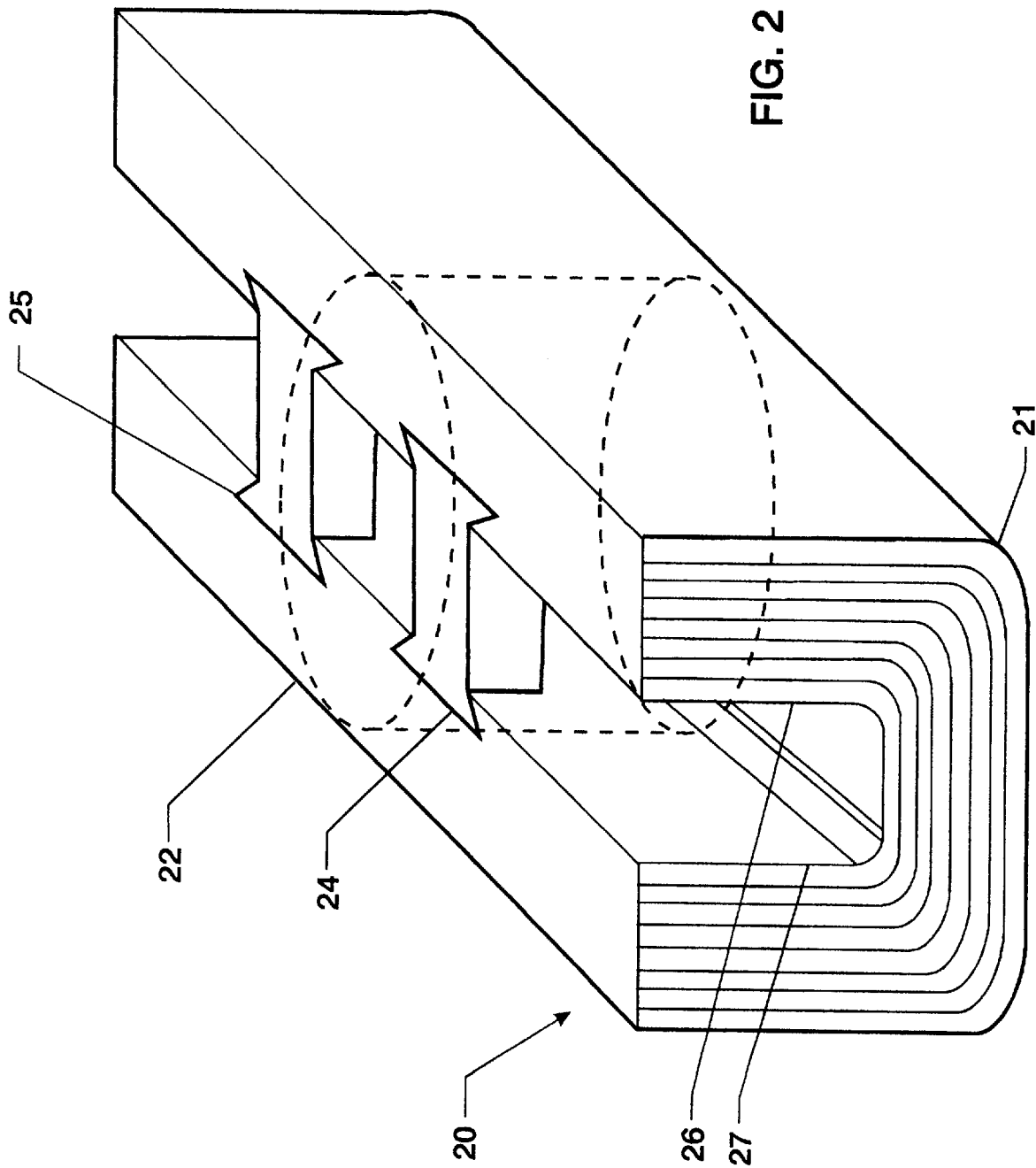
FIG. 2 is an illustration of a "U"-shaped channel billet for making a carbon-carbon composite piston according to the present invention.

The improvement claimed hereinafter comprehends fabricating carbon-carbon composite pistons from a billet composed of woven carbon-fiber fabrics or unidirectional carbon-fiber yarns, referred to hereinafter as "tapes." Refer to FIGS. 2 through 4, which depict carbon-carbon composite piston architectures cut from a "U"-shaped channel, a "T"-bar shaped channel, or a shape comprising a combination of these two forms, called a "Double T," respectively. The claimed improved process began by stacking plies, or "laminae," 21, 31, 41 of woven, two-dimensional carbon-fiber fabric or unidirectional tape, which have been prepregged with carbonaceous resins. The laminae 21, 31, 41 were directionally-oriented to tailor both the structural and thermal properties of the cut piston blanks 22, 32, 42.

To fabricate a "U"-shaped channel billet 20, the laminae 21 were stacked over a male mandrel (not shown). To fabricate a "T"-bar shaped channel billet 30, the laminae 31 were stacked over two mold segments (not shown), to create two "L"-shaped plies 33, 34 which, when oriented back-to-back, formed the "T"-bar shaped channel billet 30. To fabricate a "Double T" channel billet 40, the laminae 41 were stacked over a male mandrel and two mold segments (not shown), in a manner such that the "U"-shaped channel plies 43 were sandwiched between each of the "L"20-shaped plies 44, 45.

During the stacking process, the laminae 21, 31, 41 were debulked as necessary, to eliminate wrinkles in the laminae 21, 31, 41. Debulking was typically accomplished using a vacuum bag.

A female mandrel (not shown), or other tooling means, was then closed over the laminae 21, 31, 41 to form an assembly, to apply a molding pressure. A compressive pressure of approximately 30 to 100 pounds per square inch (psi) acting normal to the laminae 21, 31, 41 was typically applied.

The assembly was then heated to fuse the laminae 21, 31, 41 and to cure the resin in the prepregged carbon fabric or tape, i.e. the matrix resin. Typically, the mold curing temperature ranges between 300 and 400 degrees F.

The molded, channel billets 20, 30, 40 were then removed from the joined mandrels and/or assembly molds and pyrolized to a temperature of 900 degrees Celsius (°C) in an inert-atmosphere furnace, to convert the organic matrix material into carbon, i.e. to carbonize the channel billets 20, 30, 40. A pyrolizing temperature of 2700 °C. may be required if any graphitizable constituents were included in the matrix precursor resins, to form graphite in situ.

In order to create a continuous, homogeneous piston skirt surface for "U"-shaped 22 or "Double T"-shaped channel blanks 42, a bridge 24 was inserted between the legs of the "U," 26, 27 to close both ends of the "U." The bridge 24 should be made of undensified carbon-carbon materials with fibers oriented in the desired direction. To ensure a tighter fit and ultimately a better bond with the channel billet 20, the bridge 24 should dovetail into the legs of the "U" 26, 27.

Dovetailing details are shown in FIG. 5. The preferred mode of making a dovetail notch 55 in a "U"-shaped channel blank 52 is to machine the dovetail in a direction transverse to the laminae 51. The notch 54 should sweep backward 58. The bridge 54 is then installed and bonded in the notch 55 and the piston blank 50 densified.

In some instances, it may be more desirable to have the orientation of the dovetail notch 55 parallel to the direction of the laminae 51. In this instance, the notch 54 should sweep downward 57. This, however, requires coring the piston blanks 52 prior to machining the dovetail notch 55 and before inserting the bridge 55.

The density of the pyrolized channel billet 20, 30, 40 then may be increased, as required, by one or more cycles of resin reimpregnation and carbonization as described in U.S. Pat. No. 4,683,809 (Taylor). Alternately, densification can be effected by direct deposition of carbon in the pores of the channel billets 20, 30, 40 using chemical vapor deposition processes which are known in the art.

Once the desired densification was achieved, piston blanks 22, 32, 42 were cored. All densified piston blanks 22, 32, 42 were then machined and burnished to final dimensions. If desired or required, grooves (not shown) for piston rings (not shown) may be machined into the completed piston blank 22, 32, 42. Typically, diamond impregnated grinding tools are used for machining as single-point cutting tools tend to inflict more subsurface damage which must be removed by additional burnishing. Burnishing the surfaces of the piston skirt, ring groove, and wrist pin hole to the final critical dimensions is desirable, to minimize or eliminate the wear which can be experienced when carbon-carbon surfaces initially contact other surfaces.

The piston crown, ring groove, and piston skirt surfaces may be coated with a ceramic or with a metallic coating, as required, to seal the surface, provide some protection against oxidation, and/or provide better tribological properties. Catalytic coatings, such as nickel, also may be applied to the crown surfaces of the finished carbon-carbon composite piston.

The invention can be practiced in other manners than are described herein without departing from the spirit and the scope of the appended claims.

What is claimed is:

1. An improved method of making carbon-carbon composite pistons, which comprises:
   (a) stacking carbon fiber laminae prepregged with a carbonaceous resin over a plurality of male mandrels, to form a laminated composite billet;
   (b) compressing a plurality of female mandrels into the laminated composite billet on the male mandrels to form a mold assembly;

(c) heating the laminated composite billet in said mold assembly to cure said carbonaceous resin in the laminated composite billet;

(d) pyrolizing said laminated composite billet to carbonize said laminated composite billet;

(e) re-impregnating said carbonized composite billet with additional carbonaceous resin;

(f) re-pyrolizing said re-impregnated composite billet to further densify said carbonized composite billet; and (g) coring a plurality of piston blanks, each with a crown and complete piston skirt surface, from the further densified laminated composite billet.

2. An improved method of making carbon-carbon composite pistons, which comprises:

(a) stacking carbon fiber laminae prepregged with a carbonaceous resin over a plurality of male mandrels, to form a laminated composite billet;

(b) compressing a plurality of female mandrels into the laminated composite billet on the male mandrels to form a mold assembly;

(c) heating the laminated composite billet in said mold assembly to cure said carbonaceous resin in the laminated composite billet;

(d) pyrolizing said laminated composite billet to carbonize said laminated composite billet;

(e) re-impregnating said carbonized composite billet with additional carbonaceous resin;

(f) re-pyrolizing said re-impregnated composite billet, to further densify said carbonized composite billet;

(g) coring a plurality of piston blanks, each with a crown and complete piston skirt surface, from the further densified laminated composite billet; and (h) machining said piston blanks to final dimensions.

3. The improved method of making carbon-carbon composite pistons as in claim 1, wherein the carbon fiber laminae are composed of woven carbon fabrics.

4. The improved method of making carbon-carbon composite pistons as in claim 1, wherein the carbon fiber laminae are composed of unidirectional carbon fibers.

5. The improved method of making carbon-carbon composite pistons as in claim 1, wherein the carbon fiber laminae are directionally oriented to tailor structural and thermal properties.

6. The improved method of making carbon-carbon composite pistons as in claim 1, wherein said plurality of female mandrels is compressed into the laminated composite billet with a normal force between 30 and 100 psi.

7. The improved method of making carbon-carbon composite pistons as in claim 1, wherein said mold assembly is heated to a temperature of approximately 300 to 400 degrees F, to cure said resin.

8. The improved method of making carbon-carbon composite pistons as in claim 1, further comprising the additional step of:

(I) machining ring grooves into the pistons.

9. The improved method of making carbon-carbon composite pistons as in claim 1, further comprising the additional step of:

(j) coating the crown and skirt surfaces of the composite piston blanks with a sealant for oxidation protection.

10. The improved method of making carbon-carbon composite pistons as in claim 8, wherein the sealant is a ceramic coating.

11. The improved method of making carbon-carbon composite pistons as in claim 8, wherein the sealant is a metallic coating.

12. The improved method of making carbon-carbon composite pistons as in claim 1, further comprising the additional step of:

(k) coating the crown surface of the carbon-carbon composite pistons with a catalytic coating.

13. The improved method of making carbon-carbon composite pistons as in claim 11, wherein the catalytic coating is nickel.

14. The improved method of making carbon-carbon composite pistons as in claim 11, wherein the laminated composite billet is U-shaped, which is defined by two open ends and two opposite legs.

15. The improved method of making carbon-carbon composite pistons as in claim 13, wherein the complete piston skirt surface of said U-shaped laminated composite billet is created by a bridging means which is inserted at each open end of and between the two opposite legs of said U-shaped laminated composite billet.

16. The improved method of making carbon-carbon composite pistons as in claim 14, wherein the bridging means comprises directionally-oriented, undensified carbon-carbon composite material inserted in a notch machined in each leg of the U-shaped laminated composite billet.

17. The improved method of making carbon-carbon composite pistons as in claim 15, wherein said notch is dovetailed in a direction transverse to the molded, prepregged carbon fiber laminae.

18. The improved method of making carbon-carbon composite pistons as in claim 1, wherein the laminated composite billet is T-bar shaped.

19. The improved method of making carbon-carbon composite pistons as in claim 1, wherein the laminated composite billet is of a combined U- and T-shape, which is defined by a central U-shaped portion having two open ends and two opposite legs.

20. The improved method of making carbon-carbon composite pistons as in claim 18, wherein the complete piston skirt surface of said U- and T-shaped laminated composite billet is created by a bridging means which is inserted at each end of and between the legs of said central U-shaped portion.

21. The improved method of making carbon-carbon composite pistons as in claim 19, wherein the bridging means comprises directionally-oriented, undensified carbon-carbon composite material inserted in a notch machined in each leg of the central U-shaped portion.

22. The improved method of making carbon-carbon composite pistons as in claim 20, wherein said notch is dovetailed in a direction transverse to the molded, prepregged carbon fiber laminae.

\* \* \* \* \*